Aug. 14, 1923.

A. E. YATES 1,465,200

SACK TURNING AND MEASURING MACHINE

Filed May 4, 1921     6 Sheets-Sheet 2

Inventor,
Arthur E. Yates
By Vernon ...
his Atty

Aug. 14, 1923.
A. E. YATES
1,465,200
SACK TURNING AND MEASURING MACHINE
Filed May 4, 1921   6 Sheets-Sheet 4
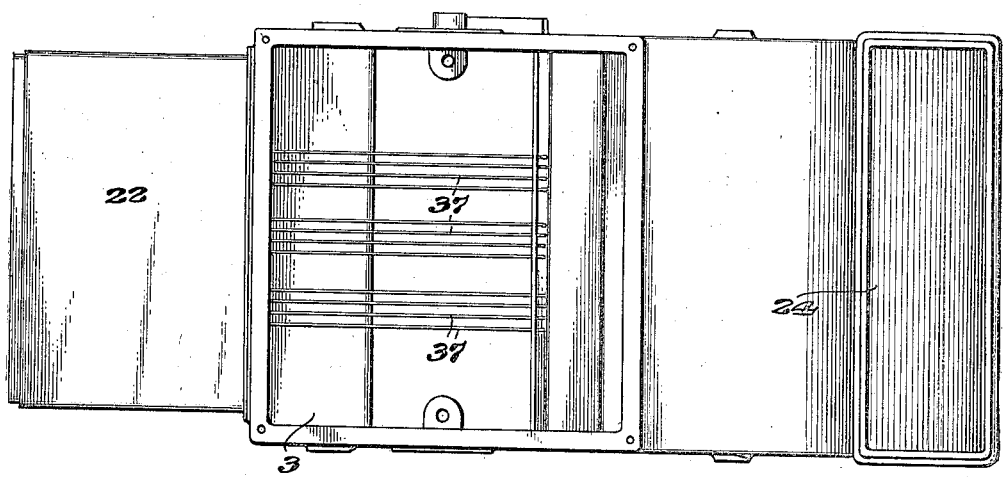
Fig. 4.
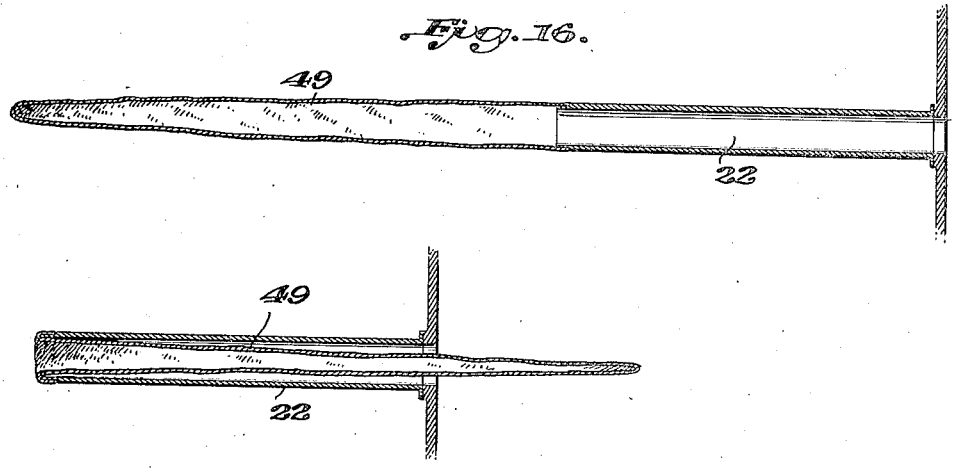
Fig. 16.
Fig. 17.
Inventor,
Arthur E. Yates
By Vernon E. Hodges
his Atty Aug. 14, 1923.
A. E. YATES
1,465,200
SACK TURNING AND MEASURING MACHINE
Filed May 4, 1921   6 Sheets-Sheet 5
Fig. 5.
Fig. 6.
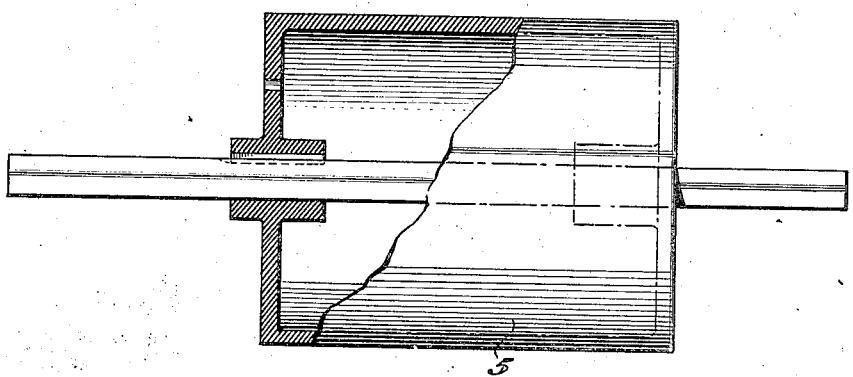
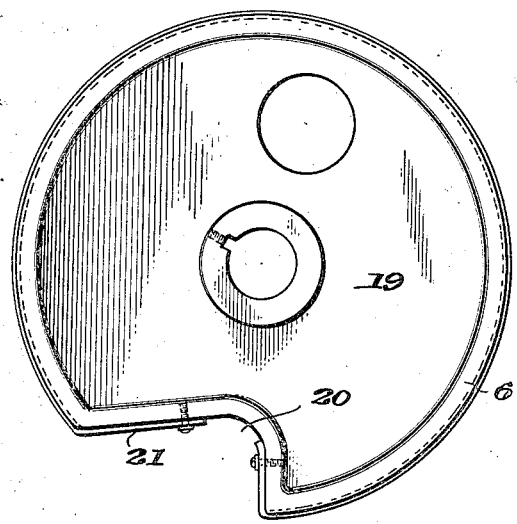
Fig. 7.
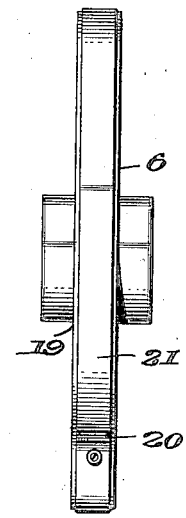
Fig. 8.
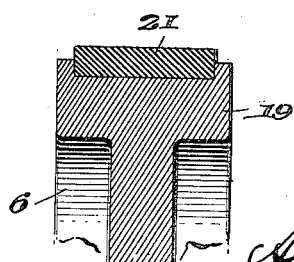

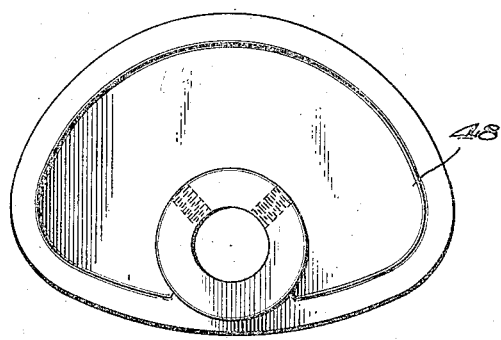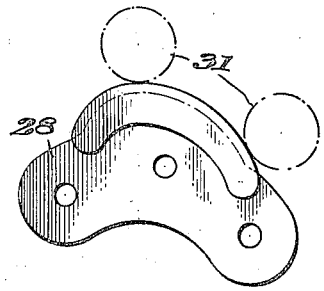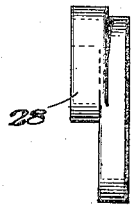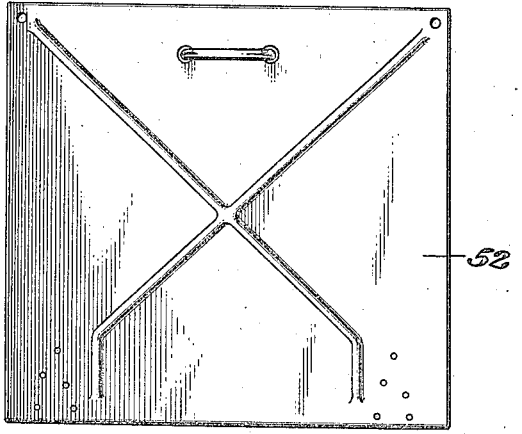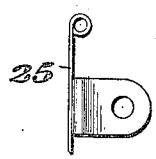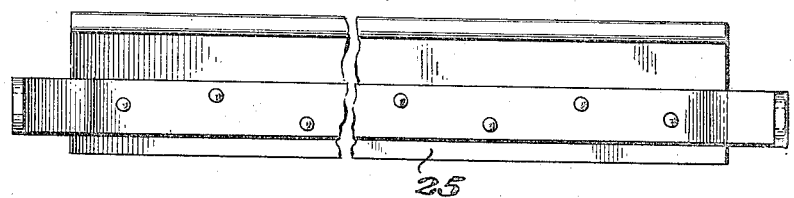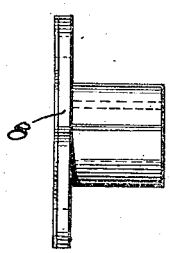

Patented Aug. 14, 1923.

1,465,200

UNITED STATES PATENT OFFICE.

ARTHUR EDWARD YATES, OF FLINTSTONE, GEORGIA.

SACK TURNING AND MEASURING MACHINE.

Application filed May 4, 1921. Serial No. 466,731.

*To all whom it may concern:*

Be it known that I, ARTHUR E. YATES, a resident of Flintstone, in the county of Walker and State of Georgia, a citizen of the United States, have invented certain new and useful Improvements in Sack Turning and Measuring Machines, of which the following is a specification.

My invention relates to an improvement in sack turning and measuring machines.

The object of this invention is to turn sacks or bags by air. The great majority of flour sacks and bags of that general description are made with the seams out, and heretofore these sacks or bags have generally been turned inside out by hand.

The present machine comprises a cylindrical feed roller geared to a system of round discs mounted on a shaft, each disc having a notch cut in the periphery, this geared mechanism running continuously when the machine is in operation, although it can be stopped instantly by a hand-lever within easy reach of the operator.

This invention further consists in means for cutting off the air at intervals and opening a trap-door for the discharge of the bag or sack.

It further consists in other automatic means for sucking the bag into the machine, turning it as it is drawn in, stopping it, ejecting it, and picking it up on fingers and depositing one bag at a time upon another in a pile at a convenient point outside of the machine.

In the accompanying drawings:

Fig. 4 is a plan view of the top roll housing,

Fig. 5 is a longitudinal section through the lower roll,

Fig. 6 is an end view of the upper roll,

Fig. 7 is an edge view of the same,

Fig. 8 is an enlarged fragmentary transverse section through the upper roll,

Figs. 9 and 10 are views of cams,

Fig. 11 is an edge view of the cam shown in Fig. 10,

Fig. 12 is a view of the cover,

Figs. 13 and 14 are views of the trap door taken at right angles to each other,

Fig. 15 is a view of one of the bearings,

Figs. 16 and 17 show the spout and a bag in position, before and after turning.

Figure 1:
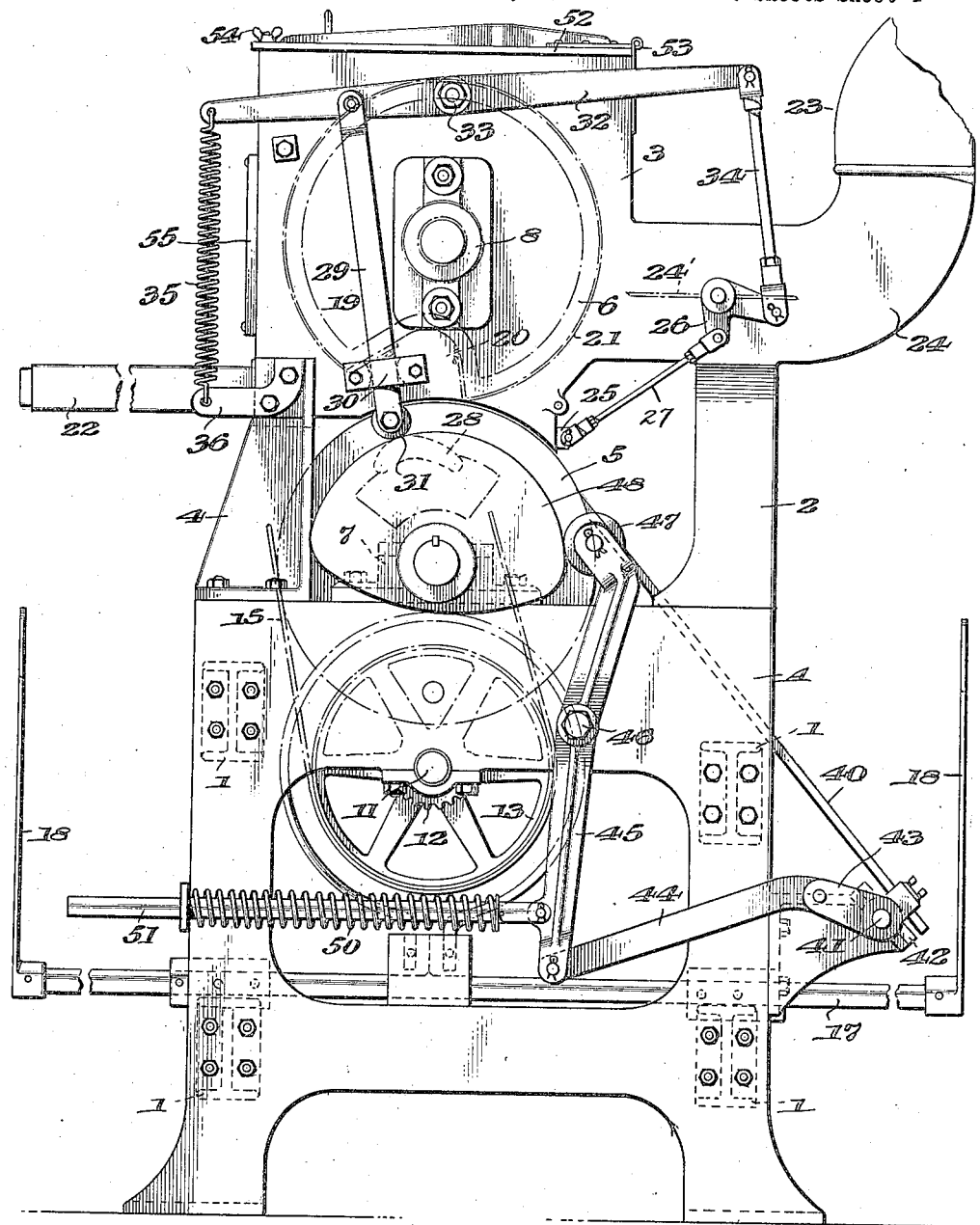
Fig. 1 is a view in side elevation of the entire machine.

A, represents the frame of the machine preferably made up of two main side castings held rigidly in place by cross-braces 1, bolted between the legs and connected across at the top with an arch beam 2, and surmounted by a top roll housing 3, securely bolted in place on top of the arch 2, and to the front supports 4.

Mounted transversely in the machine are two main rolls, namely, the lower roll 5, and the upper roll 6. The shafts bearing these rollers are journaled in pillow blocks 7, and bearings 8 respectively. And these shafts are provided with gears 9 and 10 for transmitting rotary motion from one to the other. In the construction illustrated, the driveshaft 11 has a pinion 12 thereon, which meshes with gear 9, for driving the latter, and loose and fixed pulleys 13 and 14 are mounted on this shaft. But obviously other means within the control of the operator, such as a clutch drive, can be used if preferred, or a motor coupled to the driveshaft. The belt 15 runs over one of these pulleys and the belt-shifter 16, secured on the rock-shaft 17, is controlled by the hand-levers 18, from either end of the machine.

By means of these hand-levers 18, the operator may start and stop the machine at any time.

The upper roll 6 is made up of a plurality of wheels as shown in Figs. 5, 6 and 7 instead of a solid drum. This arrangement has been found advantageous since the solid drum would not work successfully as it interfered with the free passage of air through the machine, whereas a drum made in this fashion permits a free passage of air through the machine. The individual wheels 19 compose the upper drum and are keyed to their central shaft, and these are each provided with a peripheral gap 20. These individual wheels 19 forming the upper drum, are faced with leather bands 21, in order to present a good friction surface to insure the bag going through the machine.

Figure 2:
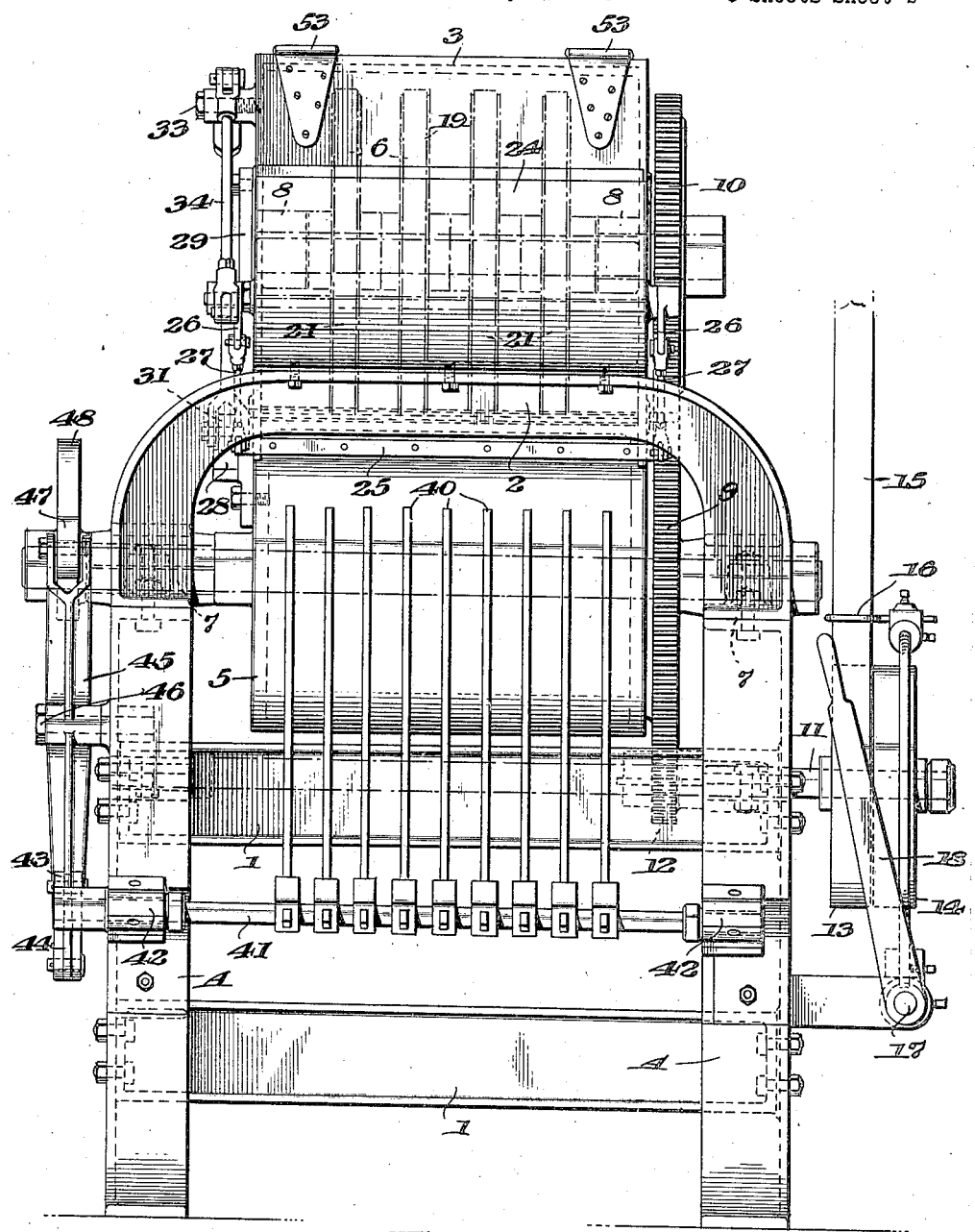
Fig. 2 is a rear elevation.

The spout 22 is located at the forward end of the machine opposite the point where the rolls 5 and 6 come together. An exhaust fan (not shown) is located at the outer end of this spout. On this spout the bag B to be turned is placed. The air is sucked through the spout 22, and discharged through the outlet 24. The suction of air is continuously applied to the machine. Its travel, however, is intermittently retarded by a butterfly valve 24', and a trap-door 25. This butterfly valve and trap-door are preferably connected through a bell-crank lever 26, mounted on the end of the butterfly-valve shaft and a connecting-rod 27, and they are simultaneously controlled and actuated to open one and close the other by a cam 28, bolted on one end of the lower roll 5, through a rod 29, which slides through a guide 30, and carries a roller 31 at its lower end which rests upon the cam as shown in Figs. 1 and 2. This rod 29 is pivotally connected with a rocker-beam 32, fulcrumed at 33, and a connecting-rod 34 extends from one end of this rocker beam to the bell-crank lever 26, and a spring 35 extends from the opposite end of the rocker beam to a lug secured on the upper housing 3, and this spring operates to hold the roller 31 in contact with the cam 28. In this way the butterfly-valve 24' and the shutter 25 are alternately opened and closed at regular intervals as the cam 28 moves beneath the roller 31.

Figure 3:
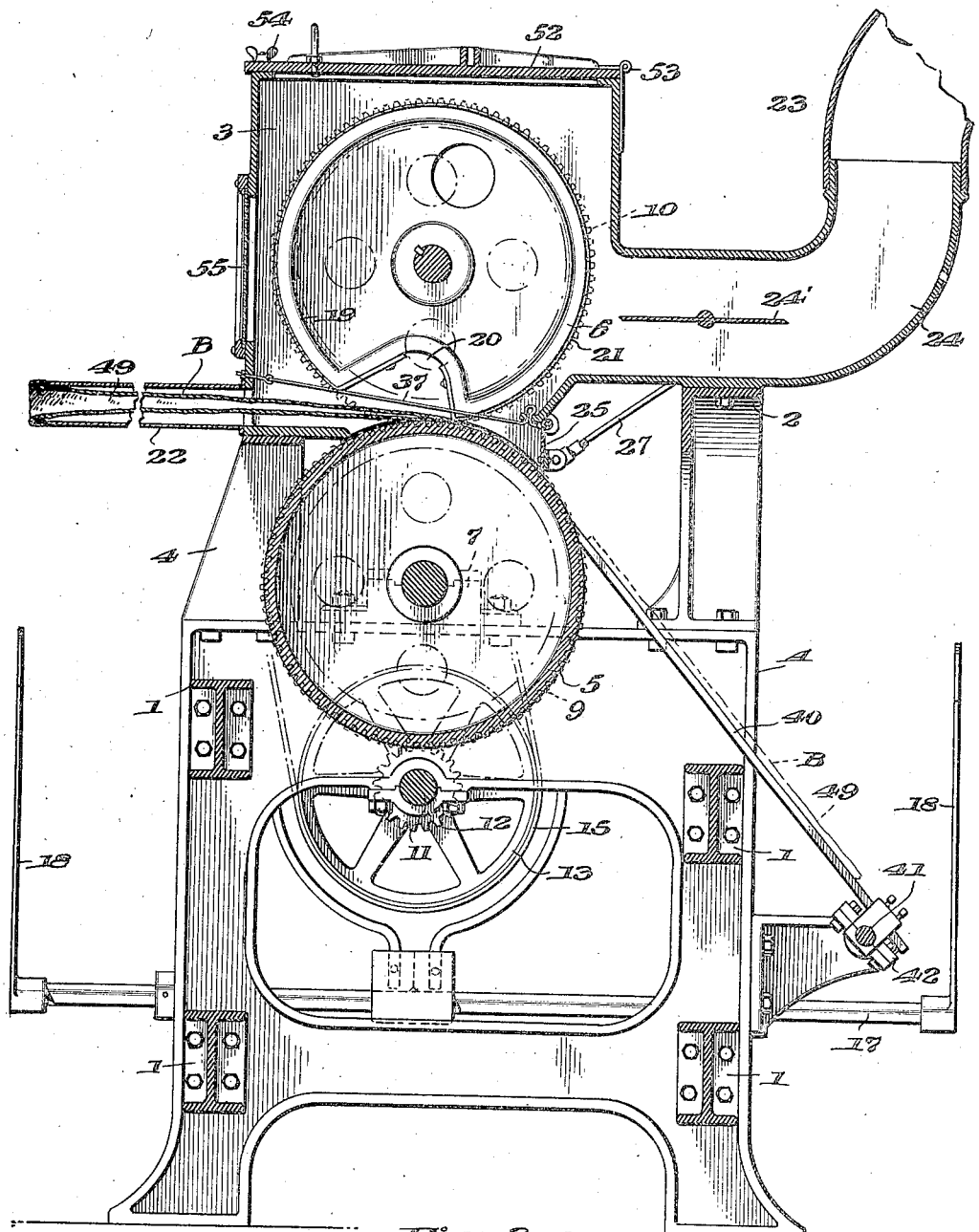
Fig. 3 is a longitudinal vertical section.

As soon as the bags are turned, the butterfly valve closes, the trap-door opens, and the rollers feed the bags through the machine, and eject them through the outlet formed by the open shutter. Small wires 37 extend more or less horizontally across the space from the top of this opening to the front of the machine as shown in Fig. 3, extending through the space between the wheels 19 of the upper drum 6. These wires hold the bags down and keep them from wadding up in the machine, or getting drawn up through the top rolls into the suction fan. When the shutter 25 is opened, and the butterfly-valve 24' is closed, the current of air stops and the bag is fed through the machine by the rollers onto the inclining fingers 40, of which there are several as shown in Fig. 2 in a line across the rear of the machine. These fingers are mounted upon the rocker-shaft 41 mounted in bearings 42, in the opposite sides of the machine. This rocker-shaft 41 has a crank-arm 43 secured on one end and a connecting rod 44 extends therefrom to the lower end of the rocker beam 45, which latter is fulcrumed on a stud 46 on the side of the machine. This rocker beam carries a roller 47 on its upper end which traverses the periphery of a cam 48 by which it is rocked. This cam 48 is keyed on the outer end of the same shaft that carries the lower roll 5, as shown in Figs. 1 and 2, and consequently rotates continuously, but the shape of the cam is such that the fingers rock back and forth at timed intervals, and as they receive a sack or bag 49 thereon they are rocked over, until the bag is deposited in a pile at the right of the machine. This rocker beam is held in position by the tension of a spring 50, mounted on a slide rod 51.

A cover 52 is held by hinge 53 at the top of the upper roll housing, and the same is conveniently secured by bolts 54.

A window 55 is bolted to the front, through which the internal mechanism of the machine may be seen at any time.

It is understood, of course, the cover and the window are bolted down air-tight. The only place that air can enter the machine is through the bag and it is by reason of the suction through the bag that the latter is turned inside out. The air reverses the bag, but the operator holds same until the periphery of the top roller pulls same off the spout and out of the fingers. The gap in the top roller does not stop the bag. But as the top roll is continuously running, the bag is fed between the top and the lower rolls very much the same way as clothes are wrung through a wringer. Due to the arrangement and timing of the cam 28, the trap-door 25 opens to let the bag out and at the same time the butterfly valve 24' cuts off the air. As the bag passes out through the trap-door 25, it slides by gravity to the position indicated on the wooden fingers 40 to the position indicated by 49 on to the fingers 40, which are operated by the cam 48, which fingers throw the bags entirely clear of the machine.

A bag is supposed to be of definite size both as to diameter and length, in order to have the rated capacity, for which it is bought. However, inaccuracies occur by the maker, and sometimes an undersized bag is made. This machine notifies the operator when a bag is turned that is too short. Although the air suction will turn short bags, only bags long enough to reach from the mouth-piece back in to the gap 20 under the periphery of the top roller will be fed through the machine. The air pressure only turns bags, the rollers feed them through. If a short bag gets into the machine, the rollers will fail to pick it up on the first revolution, then the operator releases the bag from over the front mouth-piece, and the air suction will then draw it clear in under the roll, which will feed it through on the second revolution, but the operator removes this short bag from the standard size.

There is no danger of making bags too long as the width of the cloth limits the length, the shortness is due to the stitching, or extra shrinkage of cloth. By making this suction pipe telescopic or of different lengths an accurate measuring device is arranged. As most bags are filled through a spout or tube, it is essential that the bag be large enough to go over the tube, and this is guaranteed by bags that have been turned on this machine. As they cannot be turned unless they are of proper size to fit over the spout of the machine, hence both the length and circumference of the bag is measured.

I claim:

1. In a sack turning machine, a suction spout upon which and through which the sack is drawn and turned, and a pair of rolls, one of which is composed of a plurality of separated wheels, having a gap therein to receive and measure sacks.

2. In a sack turning machine, a suction spout upon which and through which the sack is drawn and turned and measured, and a pair of rolls to receive the sacks therebetween, one of said rolls composed of a plurality of separated wheels having a gap therein to receive and measure the sacks, and means extending between the rolls to hold the bag down and prevent its wadding up in the machine, or getting into the suction fan.

3. In a sack turning machine, a suction spout upon which and through which the sack is drawn and turned, and a pair of rolls, one of which is composed of a plurality of separated wheels, having a gap therein to receive and measure sacks, the machine having an air outlet and a bag outlet, and a valve and shutter respectively for automatically controlling and alternately opening said outlets.

4. In a sack turning machine, a pair of rolls, one of which is composed of a plurality of separated wheels having a gap through the peripheries to receive and measure the sacks, a suction spout leading from outside the machine to the space between the rolls upon which and through which the sacks are drawn.

5. In a sack turning machine, a pair of rolls, one of which is composed of a plurality of separated wheels having a gap through the peripheries to receive and measure the sacks, a suction spout leading from outside the machine to the space between the rolls upon which and through which the sacks are drawn, and wires stretched in the space between the rolls and between the wheels of the upper roll for holding the bags down and preventing their wadding up in the machine, or getting into the suction fan.

6. In a sack turning machine, a pair of rolls, one of which is composed of a plurality of separated wheels having a gap through the peripheries to receive and measure the sacks, a suction spout leading from outside the machine to the space between the rolls upon which and through which the sacks are drawn, an air outlet and a bag outlet, a valve, a shutter and means connecting said valve and shutter whereby they are actuated simultaneously to close one and open the other.

7. In a sack turning machine, a pair of rolls, one of which is composed of a plurality of separated wheels having a gap through the peripheries to receive and measure the sacks, a suction spout leading from outside the machine to the space between the rolls upon which and through which the sacks are drawn, an air outlet and a bag outlet, a valve, a shutter, means connecting said valve and shutter whereby they are actuated simultaneously to close one and open the other, and means for opening and closing said valve and shutter with each complete revolution of the rolls.

8. In a sack turning machine, a pair of rolls, means for driving same, a suction spout upon which the sacks are placed and through which they are drawn between the rolls, an air outlet and a sack outlet, means for opening one of said outlets and simultaneously closing the other, fingers in position to receive the sacks as they drop through the sack outlet and means for throwing each sack thus received at a point entirely clear of the machine, said means including a spring actuated rocker beam, a connecting rod extending therefrom to the fingers and a cam for rocking the rocker beam.

9. In a sack turning machine, a pair of rolls, means for driving same, a suction spout upon which the sacks are placed and through which they are drawn between the rolls, an air outlet and a sack outlet, means for opening one of said outlets and simultaneously closing the other, fingers in position to receive the sacks as they drop through the sack outlet, means for throwing each sack thus received at a point entirely clear of the machine, a valve, a shutter, and means for actuating the valve and shutter including a bell crank lever, connecting rods, a spring actuated rocker beam, a slidably mounted rod connecting same and a cam carried by one of the rolls for sliding the rod, rocking the rocker beam and bell crank lever whereby to simultaneously actuate the valve and shutter.

In testimony whereof I hereunto affix my signature.

ARTHUR EDWARD YATES.